June 25, 1963  C. BRITNELL  3,095,567
NAVIGATION ARRANGEMENT
Filed Nov. 17, 1959  5 Sheets-Sheet 1

INVENTOR
CLIVE BRITNELL
BY
ATTORNEY

June 25, 1963  C. BRITNELL  3,095,567
NAVIGATION ARRANGEMENT
Filed Nov. 17, 1959  5 Sheets-Sheet 3

INVENTOR
CLIVE BRITNELL
BY
Henry Huff
ATTORNEY

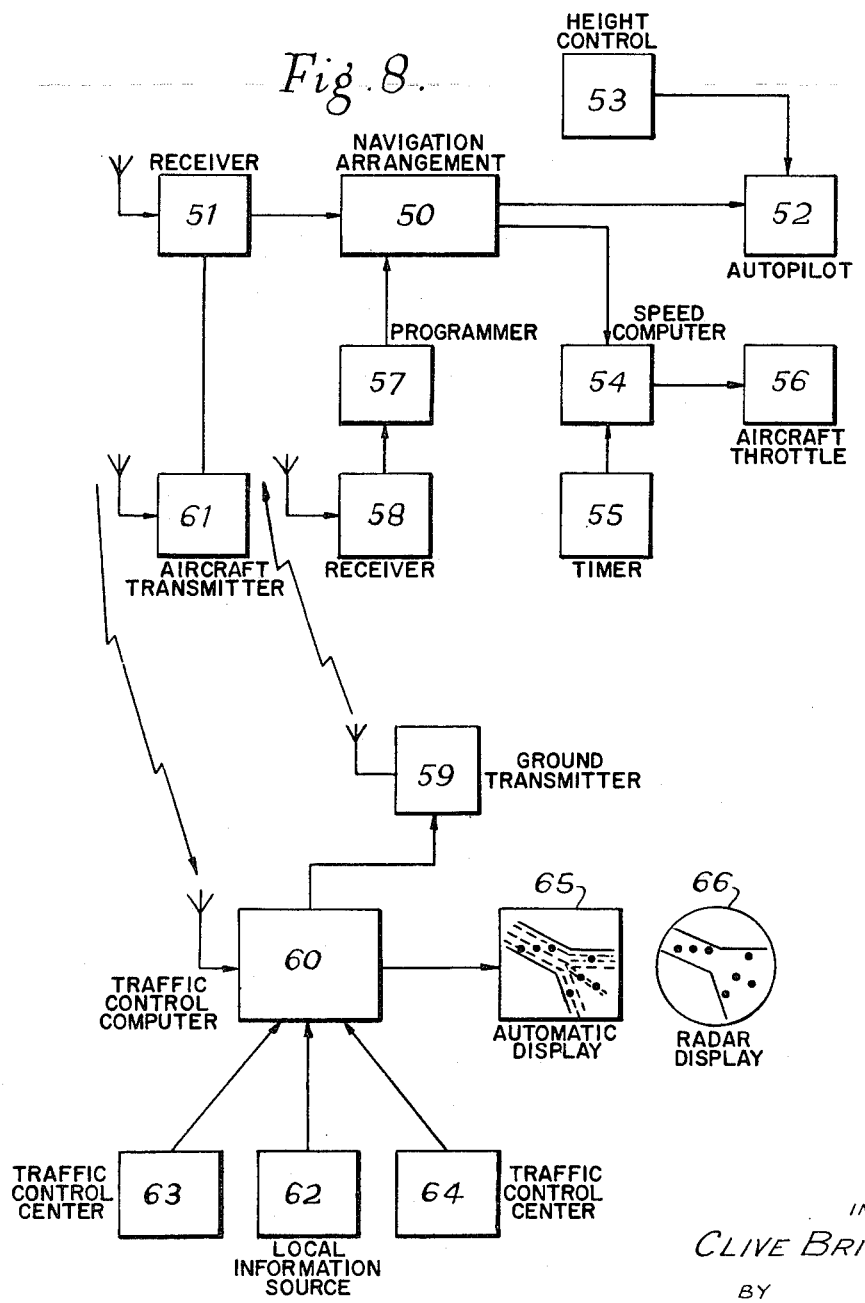

United States Patent Office 3,095,567
Patented June 25, 1963

3,095,567
NAVIGATION ARRANGEMENT
Clive Britnell, Feltham, England, assignor to The Sperry Gyroscope Company Limited, Brentford, England, a company of Great Britain
Filed Nov. 17, 1959, Ser. No. 853,614
Claims priority, application Great Britain Oct. 23, 1959
10 Claims. (Cl. 343—112)

This invention relates to navigation arrangements and seeks to provide an improved form thereof.

In accordance with the invention there is provided a navigation arrangement comprising electric means arranged to adjust two electrical quantities to a desired ratio which defines to the navigation arrangement a path between a first point and a second point, means adapted to vary each of said two electrical quantities in accordance with variations of the position of the navigation arrangement relative to said first and second points, and means adapted to be responsive to the ratio between the two electrical quantities.

The invention also provides a navigation arrangement comprising electric means adapted to adjust two electrical quantities to a desired ratio which defines to the navigation arrangement a path between two points, means adapted to vary each of the electrical quantities in accordance with variations of the position of the navigation arrangement relative to said points, and indicator means adapted to be responsive to the two electrical quantities and to indicate the actual ratio between the quantities relative to said desired ratio and the sense of any departure therefrom of the actual ratio.

Further the invention provides a navigation arrangement comprising electric means adapted to adjust two electrical quantities to a desired ratio defining to the navigation arrangement a path between two points, means adapted to vary each of the electrical quantities in dependence upon variations of the position of the navigation arrangement relative to the points, and steering means adapted to be responsive to the ratio between the two electrical quantities and effective to vary the position of the navigation arrangement to maintain the actual ratio between the electrical quantities approximately equal to the desired ratio.

In order that the invention may be more readily understood some particular embodiments thereof will now be described by way of example only and with reference to the accompanying drawings in which.

Figure 1:
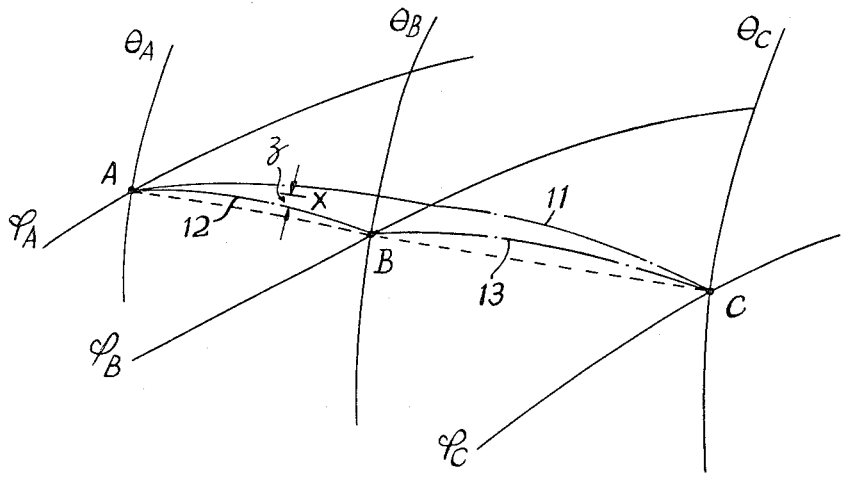
FIGURE 1 is a diagrammatic chart of the course to be followed by the navigation arrangement in accordance with the present invention with respect to coordinate hyperbole of a loran type navigation system.
Figure 2:
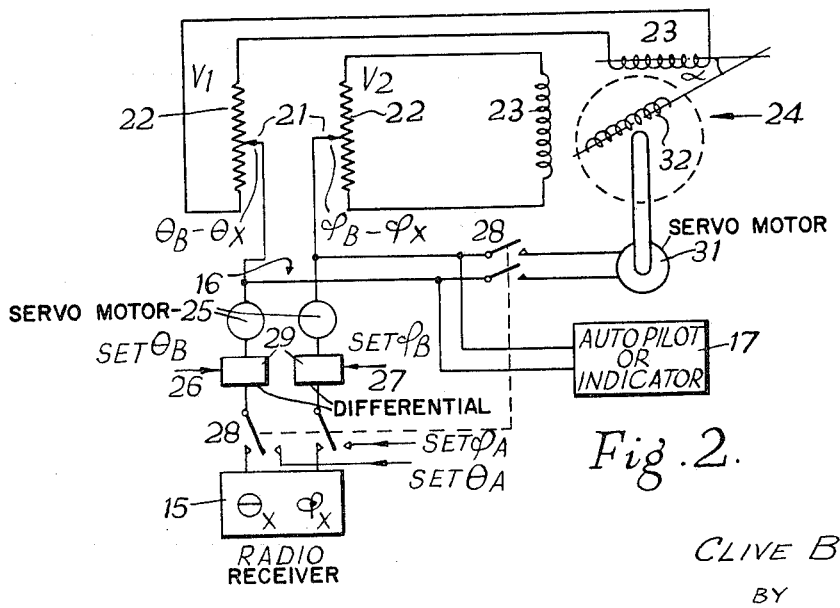
FIGURE 2 is a diagram of apparatus used in the computer.
Figure 3:
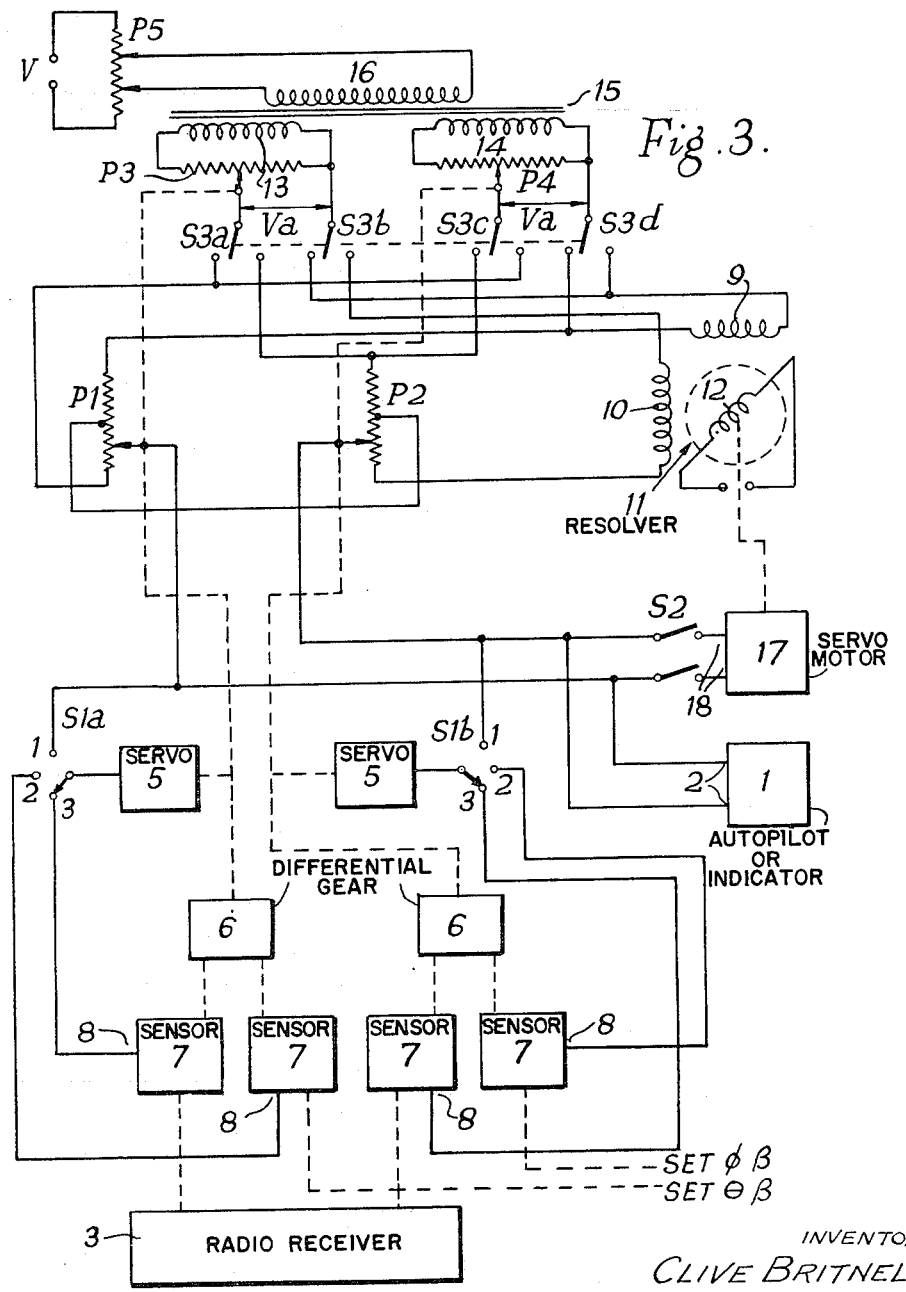
Figure 4:
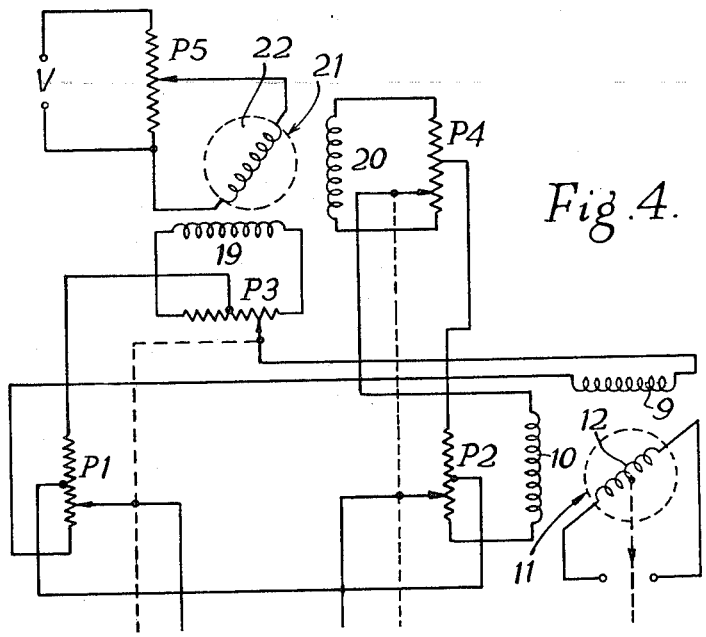
Figure 5:
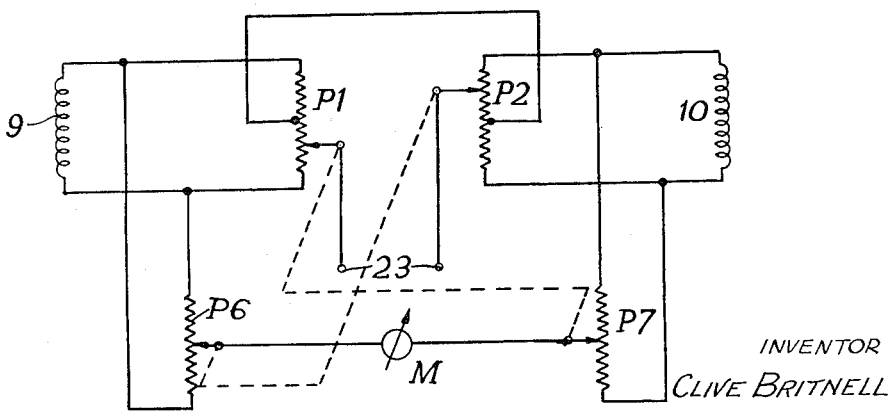
Figure 6:
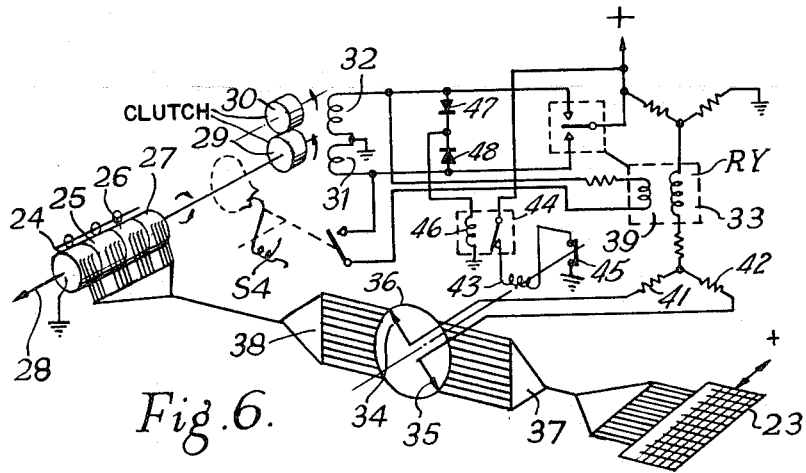
Figure 7:
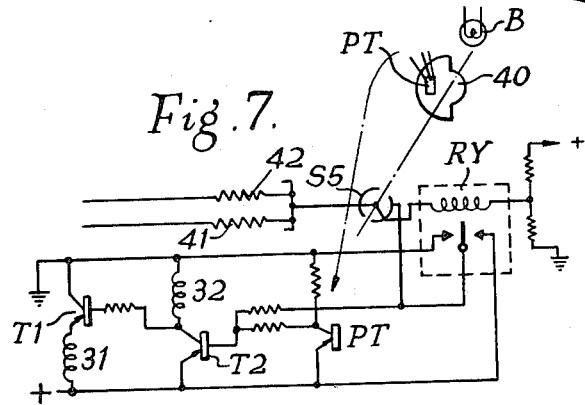
Figure 9:
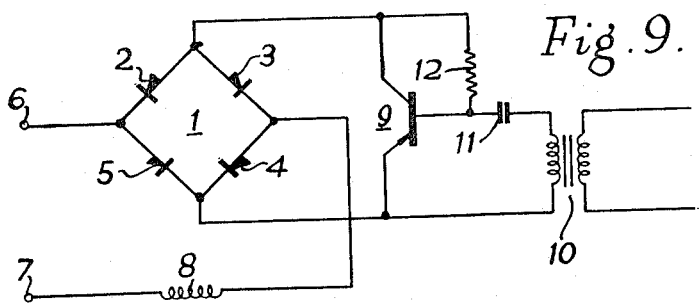

FIGURE 3 is a part schematic diagram of a particular navigation arrangement in accordance with the present invention and suitable for use in an aircraft, FIGURE 4 is a partial circuit diagram of a modification which can be applied to the arrangement shown in FIGURE 3, FIGURE 5 is a partial circuit diaagram of a further modification which can be applied to the arrangement shown in FIGURE 3, FIGURE 6 is a part schematic diagram of part of another navigation arrangement in accordance with the present invention and also suitable for use in an aircraft, FIGURE 7 is a part schematic diagram of a modification which can be applied to the arrangement shown in FIGURE 6, FIGURE 8 is a schematic diagram of a further embodiment of a navigation arrangement in accordance with the present invention, and FIGURE 9 is a circuit diagram of an amplifying phase sensitive rectifier device adapted for use in the arrangements shown in FIGURES 1 to 8.

The navigation arrangements in accordance with the present invention employ a two-coordinate position-fixing system such, for example, as the Decca navigation system or the loran navigation system. In such a system any position within the area covered by the system can be defined by two coordinates each of which defines one line of a set of lines, each of which is the locus of all points in the area at which a certain radio-defined quantity is approximately constant. Suitable radio apparatus at the same point as the navigation arrangement can determine which of the lines of each set passes through that point so that its position in relation to the navigation system may be determined precisely and without ambiguity as that point at which the two defined lines intersect.

The navigation arrangements of the present invention provide either a simple indicator by which the person in charge of a craft carrying such navigation arrangement can cause the craft to follow a desired course, or provides information in the form of an electric signal which can be used automatically to control the course of a craft carrying such navigation arrangement.

Broadly the navigation arrangements according to the present invention employ a two-coordinate position-fixing system as a position reference and include computing means arranged to be supplied with data defining the coordinates of a first point and of a second point, said points being the beginning and end of a path to be followed by a craft. The computing mechanism is also arranged to receive an input defining the coordinates of the actual point of the craft. From the computing mechanism an output is derived which represents the departure of the craft from the line between said points.

If the coordinate lines of the position-fixing system used are straight lines, then approximately straight lines may be defined between any two desired points within the area covered by said system. However, in the case of the Decca and loran navigation systems referred to the coordinate lines are usually hyperbole, but if the line between said points is short enough, the parts of the hyperbole in the regions concerned may approximate to straight lines so that the line between said points will also be approximately straight. In general, in the case of a navigation system in which the coordinate lines are hyperbole, the nearer the two points are together the nearer will the line be to a straight line. If the two points are far apart the line actually defined between them, and which the craft follows, may be made approximately straight by selecting a plurality of successive pairs of points a short distance apart.

In order to provide an output signal representing the departure of the craft from the line between said two points, the computing means may be arranged to provide an output signal representing the difference between the product of a said first multiplier and one of the coordinate differences between the position of the craft and the destination on the one hand, and the product of a second multiplier and the other coordinate difference on the other hand. It can be shown that this difference, which constitutes the output signal of the computing means, will have an approximately fixed value, such, for example, as zero value, as long as the craft is on the correct line. The variation of the output signal will be approximately proportional to any displacement of the craft from that line.

The coordinate differences of the craft's position with respect to the destination could, for example, be obtained by driving the wipers of two potentiometers each by the output of one of two differential devices, the inputs to one of which are the $\Phi$ coordinates of the craft position and the destination, and the inputs to the other of which are the $\theta$ coordinates.

Conveniently the computing mechanism has a setting mode of operation in which the multipliers are set so that the output is zero if the position of the craft coincides with the starting point.

For convenience in setting suitable values of the multipliers to fulfill the above condition it may be arranged that the ratio of the multipliers is proportional to the tangent of the angle which is made between a rotor winding and a stator winding of a resolver, and which in the setting mode of operation receives the output of the computing mechanism to rotate the rotor until it becomes zero.

When, as has been suggested above, the desired course consists of a number of successive lines each originating from the destination point of the preceding line, there may be a storage device capable of storing manually-set-in coordinates of successive points on a desired course so that each point can be used in turn as a destination, and switch means automatically operative when the craft's position coordinates become the same as or close to the destination coordinates to supply to the computer mechanism the coordinates of the next point on the course after the destination as an input defining a subsequent destination.

The switch means may be operative at the same time to supply as an input defining a starting point, the co-ordinates of the previous destination or the coordinates of the craft's position at the time of switching, or the co-ordinates of a point a little in advance of the previous destination, or the craft's position at the time of switching the previous direction of travel.

In FIGURE 1 a starting point and destination of a desired course for an aircraft are shown at A and C and have coordinates respectively of $\Phi_A\theta_A$ and $\Phi_C\theta_C$. As has been described above, the invention aims at controlling an aircraft to fly from A to C on a line which is the locus of all points (such as N with coordinates $\theta_N\Phi_N$) which satisfy the equation:

$$\theta_C - \theta_N = K(\Phi_C - \Phi_N)$$

and the particular line is taken which passes through the starting point A. In other words K is chosen so that $$\theta_C - \theta_A = K(\Phi_C - \Phi_A)$$

This line might be as shown at 11 in FIGURE 1 and it might be decided that this line was too far displaced laterally from the straight line AC for the flight to be economical. Accordingly a point B is chosen on the straight line AC, and the chosen course for the aircraft consists of the line 12 from A to B together with the line 13 from B to C. This approaches more closely to the straight line AC.

In the interests of simplicity only the coordinates of the points A, B, and C, have been shown in FIGURE 1, but it will be appreciated that any point in the area covered by the system will have coordinates defining its position.

The aircraft carries apparatus shown in FIGURE 2. A radio receiver 15 provides information giving the components $\theta_X$ and $\Phi_X$ of the position of the aircraft at the instant concerned, and this information is supplied as one input to computing mechanism which also receives set inputs representing the coordinates of the starting and finishing point of a line along which the aircraft is required to travel. The output from the computing device appears at 16 and is used to control an auto pilot or an indicating instrument 17 by means of which the aircraft can be controlled because, as will be described below, this output represents approximately the lateral displacement Z (FIGURE 1) of the point X representing the aircraft's position from the line 12 along which it should fly.

The output 16 is actually obtained as the voltage between the wipers 21 of two potentiometers 22 which are energised respectively from the two quadrature stator windings 23 of a resolver 24. The wipers 21 are driven by respective servomotors 25 in accordance with the co-ordinate differences of a point with respect to the destination point $\theta_B\Phi_B$ of the desired line.

In use it is first necessary to set up the apparatus to define the desired line, and the first step is to set in the coordinates of the destination B at 26 and 27. A switch 28 is set so that the coordinates of the starting point A are fed as an input each to one of two differentials 29 whose outputs are respectively the two coordinate differences of A with respect to B, and these are used to drive the servo-motors 25 so that the potentiometer wipers 21 are set in positions corresponding to these co-ordinate differences.

It will be seen that to define the desired line $$(\theta_B - \theta) - K(\Phi_B - \Phi_A)$$

must be zero, or $V_1(\theta_B - \theta_A) - V_2(\Phi_B - \Phi_A) = 0$.

The setting stage consists in adjusting the voltages across the potentiometer windings 22 to have values $V_1$ and $V_2$ which satisfy this equation, both in magnitude and sign.

In the setting stage the output 16 is connected through an arm of the switch 28 to control a servomotor 31 which drives the rotor 32 of the resolver 24. It will be seen from FIGURE 2 that the voltages of the stator windings 23 of the resolver are respectively proportional to sin $\alpha$ and cos $\alpha$ so that $$K \text{ which is } V_2/V_1 = \tan \alpha$$

There are two settings of the rotor 32 such that the equation is satisfied and the output 16 is zero, and one of these is stable. The rotor is thus set to this setting.

When this condition has been achieved the tracking stage is reached, and the rotor 32 is locked and the switch 28 is operated so that the inputs to the differentials 29 are no longer the co-ordinates of the starting and finishing points AB of the line but are now the coordinates of the position X of the aircraft as derived from the radio receiver 15 and the finishing point B of the line.

As long s the aircraft is on the line 12, the output 16 will be zero, and there will be no error signal given on the indicator 17 or fed to the auto pilot, since the wipers 21 will both be moving to keep the equation satisfied. If, however, the aircraft deviates from the line 12, there will be an output from 16 which is not zero.

It can be shown mathematically that this output is roughly proportional to the actual lateral displacement of the aircraft from the line 12 at all points along the line provided that the curves defining the coordinates $\theta_A\theta_B$, $\Phi_A\Phi_B$ are not far removed from straight lines.

Accordingly it can be used to control the auto pilot or can be used to give an error signal which the pilot can use in steering his aircraft.

When the aircraft reaches or approaches B as can be determined when the output of a device (not shown) which is responsive to the coordinate difference $\theta_B - \theta_X$ falls below a certain limit, it is necessary to reset the apparatus to define the line 13 from B to C rather than the line 12 from A to B, and accordingly the switch 28 is operated to reset the resolver rotor 32 so that the voltages $V_1$ and $V_2$ across the potentiometer windings 22 are suited to the new line 13, while of course the inputs at 26 and 27 to the differentials 29 are now set to correspond to the curves $\theta_C$ and $\Phi_C$ of the new desination rather than $\theta_B$ and $\Phi_B$.

The other set coordinates defining the starting of the second line may be the coordinates $\theta_B$ and $\Phi_B$ of the destination of the previous line, or they can be the co-ordinates $\theta_X$ and $\Phi_X$ of the position of the aircraft at the time of switching as derived from the radio receiver 15, while a third possibility is that they are components computed as a position displaced from one of these two positions in the direction in which the aircraft has been flying.

This latter possibility will enable the aircraft to turn smoothly on to its course along the new line.

In the arrangements shown in FIGURES 3 to 8 the output signal of the computing means is derived in a manner different from that described in connection with the arrangements of FIGURES 1 and 2.

Very broadly the electric signal includes a computing component so that the track defined is more nearly the ideal track between the aircraft and its destination. The electric signal may comprise two components each representing one of the coordinates defining the instantaneous position of the aircraft and the biassing may be introduced by varying the ratio of these signal components from the correct ratio for said position.

Turning now to FIGURE 3 the first arrangement includes an auto pilot or indicator 1. In the case of an auto pilot the control surfaces of the aircraft are actuated to correct any displacement from the track in response to input signals applied to the terminals 2.

In the case of an indicator the aircraft is flown manually in such a manner that the indicator indicates no departure from the desired track. The input signals for the auto pilot or indicator 1 are derived from the wipers of a pair of potentiometers 21 and 22. The arrangement also includes a radio receiver 3 which is adapted to receive radio signals of a hyperbolic radio navigational system, such for example as the Decca system, and to provide any two of three output signals at the terminals 4 to define the instantaneous position of the aircraft.

The position of the wipers of the potentiometers P1 and P2 are controlled by electromechanical servo devices 5 which have the position of their rotors adjustably controlled by the output shafts of differential gears 6. The output shafts of these differential gears 6 move in accordance with the setting of two input shafts. Each input shaft is adapted to be rotated by the output shaft of a sensor device 7. Each sensor device has an input shaft and comprises electromechanical means whereby the output shaft can be made to follow the movements of the input shaft. One sensor 7 associated with each of the differential gears 6 is coupled to two of the output shafts of the receiver 3 to accept the received positional data therefrom. The input shaft of the remaining sensors 7 is each coupled to a manual control by which the coordinates $\theta_B$ and $\Phi_B$ which define the destination of the aircraft can be set. The sensors 7 each have an electrical connection 8 from which signals for actuating the servos 5 may be derived by means of the switches S1a and S1b.

The potentiometers P1 and P2 each have a helical track across which is applied a potential difference derived from the stator windings 9 and 10 of a resolver 11. The centre points of the potentiometers are connected together in order to enable the sense of potentials from the wipers to be varied and to keep the relative potentials on the wipers substantially constant irrespective of variations in the absolute potential of an electric power source V (not shown in detail) which feeds the rotor 12 of the resolver 11.

A correcting voltage Va is applied in series between the secondary windings of the resolver 11 and each of the potentiometers P1 and P2. These correcting voltages are derived from further potentiometers P3 and P4 which have applied across them potentials from secondary windings 13, 14 of a transformer 15, the primary winding 14 of which is supplied with electric power from a potentiometer P5.

In order that the amplitude and sense of the potential applied to the primary winding 16 can be varied the potentiometer P5 is centre-tapped and one terminal of the winding 16 is connected to the centre tap and the other to the slider. The potentiometer P5 is conveniently connected to the same electric power source V as the rotor winding 12.

The relative amplitude and sense of the potentials applied to the potentiometers P1 and P2 from secondary windings 9 and 10 of the resolver 11 can also be varied as required by rotation of the rotor winding 12. The rotor winding 12 is mechanically movable by a servomotor 17, the input terminals 18 of which are connectible in shunt with the input terminals 2 of the auto pilot 1 upon actuation of the switch S2. The actuation of switch S2 serves simultaneously to connect the terminals 18 in shunt with the terminals 2.

The arrangement shown in FIGURE 3 may be operated in three conditions. In the normal operating condition the switch S1 is in position 3 in which the servos 5 are connected to the sensors 7 which receive the positional information from the Decca receiver 3. Thus the servos 5 are effective to move the wipers of the potentiometers P1 and P2 in accordance with the positional information from the Decca receiver. In this condition means are arranged to lock the shafts for setting the destination coordinates $\theta_B$ and $\Phi_B$.

The switch S1 is also movable to position 1 in which the apparatus may be set up. When the switch S1 is moved to position 1 the servos 5 are actuated to move the wipers of potentiometer P1 and P2 to their centre taps. Actuation of the switch S1 to this position is arranged at the same time to break the mechanical connection between the sensors 7 and the Decca receiver 3, and at the same time to maintain in their locked condition the shafts by which the destination coordinates $\theta_B$ and $\Phi_B$ are set. In order to set the coordinates of the destination into the apparatus the switch S1 is moved to position 2 in which the connections between the Decca receiver 3 and the synchros 7 are re-established but are locked against rotation. In this position the shafts for setting the destination coordinates are unlocked to enable them to be rotated as desired.

When the destination coordinates are being set the servos 5 drive the wipers of potentiometers P1 and P2 away from their centre taps to produce a potential difference at the input terminals 2 of the auto pilot 1, and also at the input terminals 18 of the servo 17 through the contacts of switch S2. The servo 17 is so arranged that it then moves the rotor winding 12 to produce potentials across the terminals of the secondary windings 9 and 10 which have the required amplitude and phase relationship as to cause the potentials at the sliders of potentiometers P1 and P2 to cancel out and re-establish the zero signal at the input terminals 2 and 18. The switch S2 is then returned to its normal condition in which the input terminals 18 are disconnected from the wipers of potentiometers P1 and P2 so as to maintain the rotor 12 in the position to which it has just been moved. There should then be no movement of the sliders of potentiometers P1 and P2 if the aircraft is at the starting position defined by the coordinates $\theta_A$ and $\Phi_A$. If the aircraft is not at the starting position an error signal will be applied to the input terminal 2 of the auto pilot 1 to cause the aircraft to follow a path such that it will position itself on a line which passes through the starting position and its destination. During the setting up procedure of the apparatus the auto pilot 1 is arranged to be controlled by a compass device, and if desired this can be arranged slowly to move to the new heading of the path between the starting position and destination which is being set into the apparatus. This movement of the compass can be effected, for example, by a servo deriving its input information from an information-carrying device such, for example, as a punched card associated with a card reader by which the information concerning the aircraft's required destination is inserted into the apparatus. Such an arrangement is described in connection with FIGURES 6 and 7.

As the aircraft progresses towards its destination the changing output signals from the radio receiver 3 drive the sensors 7, and hence the servos 5 through the differential gears 6, to move the wipers of potentiometers P1 and P2. If the aircraft is following the correct track, the rate of movement of the wipers of these potentiometers P1 and P2 is in such a relationship to the potentials applied across them that there remains at the input terminals 2 of the auto pilot 1 an electric signal having a zero value. Any departure of the aircraft from its required track will cause the wipers of the potentiometers P1 and P2 to be driven in an incorrect manner, thereby producing between the input terminals 2 an electric signal having a value differing from zero. This signal causes the auto pilot to change the course of the aircraft until the electric signal again has a zero value. In the case of an indicator to indicate the deviation of the aircraft from the required track, the pilot will steer a course such as to cause the indicator to indicate that the aircraft has returned to the required track.

The correction voltage $Va$ is such as to bias the electric signal, derived from the wipers of potentiometers P1 and P2 and fed to the input terminals 2 of the auto pilot 1, in such a sense that the curved path which would be followed by the aircraft is altered so that its actual path is more nearly a straight line from the starting point to the destination. In practice the course followed by the aircraft is caused first to deviate to one side of a straight line between the starting point and destination and then gradually to return to the straight line path, cross it, and then return towards it on a track at a small angle thereto, the aircraft track and straight line crossing again at the destination. By appropriate variation of the biassing voltage the aircraft may be made to follow any desired course relative to the straight line path between its starting point and its destination. Since if the bias voltage were present as the aircraft neared its destination it would be caused to arrive at some other destination displaced from its true destination in a direction and by an amount determined by the biassing effect of the correction voltages, the correction voltages are caused gradually to decrease to zero as the aircraft nears its destination.

To effect this the wipers of potentiometers P1 and P3 are mechanically coupled, as are the wipers of potentiometers P2 and P4. The switch S3 is arranged to allow the correction voltage $Va$ from potentiometer P3 to affect the potential across potentiometer P2 instead of across potentiometer P1, while simultaneously causing the correction voltage from potentiometer P4 to affect the potential across potentiometer P1 instead of P2. This allows errors which under some circumstances may be introduced by the correction voltages to be minimised.

The arrangement shown in FIGURE 3 by which the correction voltage $Va$ is obtained may be modified in the manner shown in FIGURE 4. Here the potentiometers P3 and P4 are centre-tapped potentiometers and have their centre taps connected to end terminals of the potentiometers P1 and P2 respectively, while their wipers are connected respectively to one of the end terminals of the windings 9, 10 of the resolver 11. The potentiometers P3 and P4 have applied between their end terminals potentials derived from the windings 19, 20 respectively of a further resolver 21. The phase and amplitude of the potentials applied across the potentiometers P3 and P4 is determined by the rotational position of the rotor winding 22 which has an adjustable potential applied to it from the potentiometers P5. The functioning of this arrangement is closely similar to that shown in FIGURE 3.

It will be appreciated that the potentials of the potentiometers P1–P4 in the arrangement shown in FIGURES 3 and 4 are related to the distance between the aircraft and its destination. It is possible to derive from these potentials an electrical signal which represents such distance.

As the positional information is restricted to the hyperbolic coordinate values, it is necessary to feed into the coupler some scaling factor if true ranges in, for example, miles, are required to be presented. The coordinate values which are proportional to the distance between the aircraft and its destination are contained on the helical potentiometers P1 and P2. Thus presentation of these two coordinate differences can be accomplished directly by using a dial-type indicator. However, if true distances are required, then the sum of the two coordinate differences must be employed to produce an electric signal which can then be scaled using a predetermined scaling factor.

Electric signals representing true distances cannot be obtained directly from the helical potentiometers. This results from the fact that if there is a large difference between the two coordinate values, then the potentiometer containing the greater information will have applied across it only a very low potential difference. In fact this potential difference could well be zero if the desired track of the aircraft was along or very nearly along a hyperbola in the hyperbolic navigation system. Of course it is this potentiometer which will provide the most important range information. It is possible, however, to use these potentiometers if an additional direct current power supply is employed for the distance-determining facility. In such an arrangement care must be taken to ensure that the accuracy with which the aircraft follows the defined track is not impaired by the loading of the alternating current component of the composite potential difference on the wipers of the potentiometers. This difficulty can be avoided by using a blocking device in the conductors carrying the range signal. Such a device may comprise either a choke or a resonant impedance arrangement. However, in practice it may be found more desirable to employ additional potentiometers and these need not be so accurate as the helical potentiometers P1 and P2. In such an arrangement these additional potentiometers may be mounted adjacent the helical potentiometers and employ a common brush carriage for the two wipers. The presentation of the range information may then be on a meter scaled, for example, from 0 to 100 percent.

If a setting device is included the meter can be set to indicate 100 percent at the starting position and then a reasonably reliable indication of the distance to the destination may be given.

One arrangement by which this indication of the distance between the aircraft and its destination may be accomplished in the arrangement shown in FIGURE 3 is shown in FIGURE 5. In that figure all parts not essential for illustrating the arrangement have been omitted, while these parts which correspond to the parts indicated in FIGURE 3 are given the same reference numeral. A potentiometer P6 is arranged in shunt with the potentiometer P1 and a potentiometer P7 is arranged in opposite sense in shunt with the potentiometer P2. The potentiometers P6 and P7 need not be so highly accurate as potentiometers P1 and P2. Strip potentiometers may effectively be used. The wiper of potentiometer P6 is mechanically coupled to the wiper of potentiometer P2, while the wiper of potentiometer P7 is mechanically coupled to that of potentiometer P1. The wipers of the potentiometers P6 and P7 are connected together through an alternating-current meter M. The meter M will give two readings either side of a central zero position so must be chosen accordingly. If it is required that only a single reading be given, it will be necessary to employ a discriminator arrangement biassed in such a way that the unwanted reading is obviated. In general the unwanted reading will be that due to the negative going signal applied to the discriminator.

The extra potentiometers P6 and P7 of FIGURE 5 can be dispensed with in a modified arrangement. In this the terminals 23 from the wipers of potentiometers P1 and P2 are each connected to one of the poles of a double-pole double-throw high-speed switch. This switch in one position connects the wipers of potentiometers P1 and P2 to the input terminals 2 of the auto pilot or indicator 1 as shown in FIGURE 1, and in the other position to a meter such as the meter M. This modified arrangement is particularly suitable when the navigation arrangement is to be used in a helicopter because an accurate indication of distance to go is required in the final stages of a flight.

In many cases it is possible to programme the navigation arrangement to define a particular track by using an information store such, for example, as punched cards, punched tapes, or a magnetic tape. Information contained in such information stores is usually in digital form and requiring converting to analogue form in order to control the position of the potentiometers in the arrangement described above. Such conversion may be effected in a digital servo, a suitable form of which will now be described. A digital to analogue converting arrangement may comprise an apparatus in which the positional information is defined in three channels X, Y, and Z from, for example, a radio receiver such as the receiver 3 in FIGURE 3.

Normally only two of these three channels are used at one time. The positional information may be conveyed, for example by means of rotatable shafts, each of which is connected, for example, through a torque servo, to one of two input shafts of a differential gear arrangement forming a mechanical subtractor. The mechanical subtractor has its other input shaft driven from a digital servo device, while its output shaft is coupled to a digital computing arrangement adapted to compute the required track, distance to destination, speed, and estimated time of arrival. The digital computing arangement may be programmed, for example, by an information carrying device such, for example, as a punched or other form of information carrying tape or more conveniently a punched card. The computing arrangement may, if desired, be connected to visual indicators for indicating the information visually. The digital servos may each have three information inputs; one a direct manual command input, the other a further manual command input the information in which has been modified in a control unit arranged to receive additional input signals from the digital computing arrangement and a tape or card reader adapted to read a programme for the computing arrangement. The third input to the digital servos is directly from the tape or card reader. This reader translates information concerning the required destinations in accordance with a predetermined plan. FIGURE 6 shows a practical arrangement of a digital servo in a digital computing arrangement as described above. In the arrangement shown in FIGURE 6 the programme is contained on a punched card 23, and the information contained thereon is compared with that contained on a set of binary coded discs 24, 25, 26, and 27.

FIGURE 6 shows a practical arrangement of a digital servo in the digital computing arrangement shown in FIGURE 1. In this digital servo the programme is contained on an information-carrying device in the form of a punched card 23. The information contained on the information-carrying device is compared with the information contained on a set of rotatable binary coding members such, for example, as the discs 24, 25, 26 and 27. These discs are coupled to a shaft 28 which replaces or is further coupled to one of the shafts for setting the destination coordinates $\theta_B$, $\Phi_B$ of the sensors 7 of FIGURE 3. A similar set of rotatable binary coded members is provided for the other of said two destination coordinate setting shafts. If desired the shaft 28 may be coupled directly to one of the input shafts of the differential gears 6 instead of being coupled to it through one of the sensors 7. The shaft 28 is arranged to be driven in either a clockwise or anticlockwise direction by means of two clutches 29, 30 through which the shaft is coupled to a prime mover (not shown) depending upon which of the clutches 29, 30 are actuated at any particular time. The clutches are rendered effective by energization of the appropriate solenoid 31, 32 by the contacts of bistable relay RY.

The relay RY has an energising coil 33 which is arranged to be energized through the brushes 34, 35 of a rotary switch 36. The switch 36 is an electromagnetically driven step-by-step switch actuated by an electromagnet 43. Energisation of the electromagnet 43 is controlled by a contact of a relay 44 and the normal interrupter contacts 45 of the switch 36. The energising coil 46 of the relay 44 is energised by the potential applied to the clutch solenoids 31 and 32, which potentials are coupled to the energising coil 46 through rectifiers 47, 48.

The contacts on the rotary switch 36 are arranged in two sections 37, 38, the section 37 has its contacts connected to reading brushes (not shown in detail) which are associated with the card 23. The apertures in the card 23 are effective to permit the brushes located on one side of the card to contact an electrode on the other side of the card to which one terminal of an electric current supply source is connected. When one of the brushes contacts the electrode through an aperture in the card a potential appears at a corresponding position of the switch section 37. This potential actuates the relay RY to energize one or other of the clutches 29, 30 and so to rotate the shaft 28 and the discs 24–27 carried thereby. The shaft 28 will have one particular rotational position peculiar to the arrangement of potentials on the switch contacts 37, and when this position has been reached, the appropriate connection will be made in switch section 38 through the brush 34 to the energising coil 33 of the relay. When this occurs the relay is again actuated and the clutch 29, 30 which has previously been energised will become de-energised so stopping rotation of the shaft 28 in the desired position.

The relay RY is also provided with a holding coil 39 through which current is arranged to pass under the control of a detent-operated switch S4, which switch is effective to allow current to pass through the holding coil 39 when the shaft 28 is in other than one of a plurality of predetermined rotational positions.

FIGURE 7 shows a modification which can be applied to the arrangement of FIGURE 6. In the arrangement shown in FIGURE 7 the coils 31, 32 of the clutches 29, 30 respectively are arranged so that the current passing through them is controlled by one or other of two transistors T1 or T2. The energising of these coils 31 and 32 is controlled by the potential applied to the base of transistor T2 by the action of the contacts of the relay RY. The energisation of this relay is controlled by a commutator switch S5 which is coupled to the shaft 28 which also carries an optical detent member 40. This detent member is arranged to locate the desired predetermined rotational positions of the shaft 28 and affects the light path between a light source such as the bulb B and a photo-transistor PT, the output signal from which is also coupled to the base of the transistor T2 so as to control the energisation of the clutch coils 31, 32. In the modification of FIGURE 7 the resistors 41, 42 are the resistors 41 and 42 shown in FIGURE 6 and are connected respectively to the brushes 34, 35 of the switch 36. In use the arrangement of FIGURE 7 must be such that the control exercised on the clutch coils 31, 32 by the contacts of the relay RY is stronger than that of the photo transistor PT. Further, the alignment of the switch S5 must be such that it is effective to control the energisation of the coils 31, 32 when the edge of the optical detent 40 lies in the vicinity of the light path between the bulb B and the photo transistor PT.

In the arrangements described in the foregoing the two potentiometers P1 and P2 have their positions varied to represent two coordinates which together define the position of the aircraft. However, it is possible to arrange these potentiometers to represent any two quantities such, for example, as desired height and actual height, or time and distance to go. By combining the arrangements previously described with a further pair of potentiometers similar to P1 and P2, and one pair arranged for example to represent the above quantities, it is possible to control the aircraft in four dimensions, that is to guide it along a predetermined track at a predetermined height and at a predetermined speed. Such an arrangement will now be described with reference to FIGURE 8.

In the arrangement shown in this figure the aircraft is provided with a navigation arrangement 50 such as described in connection with FIGURES 3 to 7 together with a hyperbolic coordinate navigation receiver 51 such, for example, as a Decca receiver. The navigation arrangement 50 is arranged to provide control signals for controlling an auto pilot 52 which is also arranged to receive a height controlling signal from a further pair of potentiometers in a height controlling device 53. The navigation arrangement 50 is also arranged to provide a distance to go signal for one of an additional pair of potentiometers in a speed computing device 54 which also receives as a second input to the other of the additional pair of potentiometers a signal representing time from a timing device 55. The speed computing device 54 is arranged to provide an output signal for actuating the throttles 56 of the aircraft.

If desired the flight of the aircraft may be controlled from the ground, its flight being modified from time to time in the light of movements of other aircraft. In such an arrangement the programming device 57 for the navigation arrangement 50 is arranged to receive signals from a radio receiver 58 which signals are effective to vary the programme of the navigation arrangement 50.

The signals received by the receiver 58 are transmitted from a ground transmitter 59 in accordance with information derived from an air traffic control computer 60. The computer 60 is arranged to receive positional information from the aircraft by means of a positional information transmitter 61 which may derive its positional information from the navigation receiver 51, and also information concerning the position of other aircraft from a local information source 62 and the adjacent air traffic control centres 63, 64. The computer 60 is effective to compute any changes to the programme 57 in the light of the information from sources 61, 62, 63 and 64. The computer 60 may also be arranged to control an automatic display 65 which may, if desired, take the form of a mimic diagram. Conveniently a radar display 66 is arranged adjacent the automatic display 65 to permit the two displays to be checked one with the other.

The arrangement shown in FIGURE 9 is an amplifying phase sensitive detector which may, with advantage, be used in the arrangements described in FIGURES 1 to 8 for rectifying the signals received by the navigation receiver, and providing a control signal for controlling the rotational positions of the shafts by which the information from the navigation receiver is fed to the computing means.

The arrangement of FIGURE 9 includes a four-way rectifier 1 constituted by silicon diodes 2, 3, 4 and 5 connected in a bridge arrangement. One diagonal is energised from an A.-C. reference-voltage source which is applied to terminals 6 and 7. A load is represented by reference 8.

The other diagonal of the bridge 1 supplies the rectified reference voltage to a transistor 9, which is connected in the common-emitter mode, the full wave rectified voltage being applied between the collector electrode and the emitter electrode.

In the absence of an input signal, the energising voltage supplied to the transistor by the full-wave rectifier has a D.-C. component superimposed on which there is a ripple at a frequency that is double the frequency of the supply voltage. No smoothing of the output of the rectifier is employed, so that the double-frequency alternating component of the energising voltage is as high as possible compared with the D.-C. component.

An alternating input signal of the same frequency as the reference voltage and in phase agreement or disagreement therewith is applied between the base and emitter of transistor 9 by way of transformer 10 and condenser 11. This signal is obviously in phase agreement with one or other of the two half-wave ripples of the energising voltage applied to the transistor. The current passed by the transistor in the corresponding half-wave period therefore becomes greater than the current passed in the other half period. As a result, a difference current flow through the load 8, which has both a D.-C. component and a component of the supply frequency. Obviously a reversal in the phase of the input signal reverses the polarity of the D.-C. component, while the phase of the supply-frequency component remains the same. Either the D.-C. component or the supply-frequency component may be used as an output, but normally the D.-C. component is so used.

A bias voltage for the base of the emitter is provided by a high resistance 12 connected between the collector electrode and the base electrode. The current passing through the resistance in this shunt circuit produces a voltage drop in the resistances, thus giving the base electrode a bias D.-C. potential different from the potential of the collector electrode. This bias potential is held steady by the smoothing effect of condenser 11 which, in conjunction with the voltage-dropping resistor 12, acts as a filter circuit to attenuate the ripple component in the collector potential.

The embodiment described provides an output signal of half volt D.C. on a load in response to an input of 2.5 mv. A.-C., when power is supplied in the form of a phase-reference voltage of a magnitude of 6.3 volts, the frequency of the signal and of the supply voltage being 400 cycles per second.

The stability and constancy of the operation of the circuit of the invention depend on there being substantial identity between the half waves of the full-wave rectified voltage with which the transistor is energised. Such identity can only exist if there is accurate balance between the two halves of the full-wave rectifier bridge, and depends on the constancy and stability of this balance. The merit of this circuit therefore ultimately depends on the fact that diodes such as silicon diodes can be obtained that are much more stable and constant than a transistor.

What is claimed is:

1. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, means for generating fifth and sixth signals, the ratio between the values of said fifth and sixth signals being related to the ratio between the values of said third and fourth signals, multiplying means connected to receive said third, fourth, fifth and sixth signals for producing seventh and eighth signals respectively representing the product of said third and fifth signals and the product of said fourth and sixth signals, and means responsive to said seventh and eighth signals as said vehicle progresses toward said desired future position.

2. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, means for generating fifth and sixth signals, the ratio between the values of said fifth and sixth signals being related to the ratio between the values of said third and fourth signals, multiplying means connected to receive said third, fourth, fifth and sixth signals for producing seventh and eighth signals respectively representing the product of said third and fifth signals and the product of said fourth and sixth signals, and indicator means responsive to said seventh and eighth signals for indicating the difference between the values of said seventh and eighth signals as said vehicle progresses toward said desired future position.

3. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, means for generating fifth and sixth signals, the ratio between the values of said fifth and sixth signals being related to the ratio between the values of said third and fourth signals, multiplying means connected to receive said third, fourth, fifth and sixth signals for producing seventh and eighth signals respectively representing the product of said third and fifth signals and the product of said fourth and sixth signals, and steering means responsive to said seventh and eighth signals for varying the course of said vehicle as it progresses toward said desired future position in accordance with the difference between the values of said seventh and eighth signals.

4. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, means for generating fifth and sixth signals, the ratio of the value of said fifth signal to the value of said sixth signal being substantially equal to the ratio of the value of said fourth signal to the value of said third signal, multiplying means connected to receive said third, fourth and fifth signals for producing seventh and eighth signals respectively representing the product of said third and fifth signals and the product of said fourth and sixth signals, and means responsive to said seventh and eighth signals as said vehicle progresses toward said desired future position.

5. A navigation arrangement as defined in claim 4 wherein said multiplying means comprises a first pair of potentiometers, each potentiometer having a positionable slider, each potentiometer being excited by a respective one of said fifth and sixth signals, and the slider of each potentiometer being positioned in accordance with the value of a respective one of said third and fourth signals, said seventh and eighth signals being producted at respective ones of said sliders.

6. A navigation arrangement as defined in claim 5 and further including a second pair of potentiometers, each said second potentiometer being coupled across a respective one of said first pair of potentiometers, means for positioning the wiper of each said second potentiometer jointly with the wiper of a respective one of said first pair of potentiometers, and means coupled to respond to the potential difference developed between said wipers of said second potentiometers.

7. A navigation arrangement as defined in claim 4 wherein said means for developing a first pair of signals representing the coordinates of present vehicle position comprises a radio navigation receiver.

8. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, further means for generating fifth and sixth signals, the ratio between the values of said fifth and sixth signals being related to the original ratio between the values of said third and fourth signals, correcting means connected to said further means for varying said ratio between said fifth and sixth signals as said vehicle progresses towards said desired future position, multiplying means connected to receive said third, fourth, fifth and sixth signals for producing seventh and eighth signals respectively representing the product of said third and fifth signals and the product of said fourth and sixth signals, and means responsive to the values of said seventh and eighth signals as said vehicle progresses toward said desired future position.

9. A navigation arrangement as defined in claim 8 wherein said correcting means causes the ratio between the values of said fifth and sixth signals to become equal to said original ratio between the values of said third and fourth signals as said vehicle reaches said desired future position.

10. A navigation arrangement for a mobile vehicle comprising means for developing a first pair of signals representing the coordinates of present vehicle position, means for developing a second pair of signals representing the coordinates of a desired future vehicle position, means connected to receive said first and second pairs of signals for generating third and fourth signals each representing the difference between the values of respective ones of said coordinates which are of the same kind, further means for generating fifth and sixth signals, the ratio between the values of said fifth and sixth signals being related to the original ratio between the values of said third and fourth signals, correcting means connected to said further means and responsive to said first pair of signals for varying said ratio between said fifth and sixth signals in accordance with changes in the values of said first pair of signals, multiplying means connected to receive said third, fourth, fifth and sixth signals for producing said seventh and eighth signals respectively representing the product of said third and fifth signals and the product of said fourth and sixth signals, and means responsive to the values of said seventh and eighth signals as said vehicle progresses toward said desired future position.

References Cited in the file of this patent

UNITED STATES PATENTS

| | | |
|---|---|---|
| 2,408,773 | Goodall | Oct. 8, 1946 |
| 2,613,351 | Lang | Oct. 7, 1952 |
| 2,636,167 | Schuck | Apr. 21, 1953 |
| 2,652,559 | Hawkins | Sept. 15, 1953 |